(12) United States Patent
Heitkamp et al.

(10) Patent No.: US 6,970,961 B1
(45) Date of Patent: Nov. 29, 2005

(54) RELIABLE AND REDUNDANT CONTROL SIGNALS IN A MULTI-MASTER SYSTEM

(75) Inventors: Ross Heitkamp, Mountain View, CA (US); Michael Armstrong, Sunnyvale, CA (US); Michael Beesley, Hillsborough, CA (US); Ashok Krishnamurthi, San Jose, CA (US); Kenneth Richard Powell, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 697 days.

(21) Appl. No.: 09/751,841

(22) Filed: Jan. 2, 2001

(51) Int. Cl.[7] .......................... G06F 13/00; G06F 11/00
(52) U.S. Cl. .......................................... 710/110; 714/11
(58) Field of Search .......................... 714/9, 11, 22, 30, 714/43, 44; 710/40, 110, 123; 340/825.21, 340/870.15

(56) References Cited

U.S. PATENT DOCUMENTS

| | | | |
|---|---|---|---|
| 4,634,110 A * | 1/1987 | Julich et al. ................... 714/11 |
| 5,166,678 A * | 11/1992 | Warrior .................. 340/870.15 |
| 5,421,002 A * | 5/1995 | Lee et al. ....................... 714/43 |
| 5,564,025 A * | 10/1996 | De Freese et al. ........... 710/110 |
| 5,644,700 A * | 7/1997 | Dickson et al. ................. 714/9 |
| 5,734,329 A * | 3/1998 | Khosrowpour et al. 340/825.21 |
| 5,771,247 A * | 6/1998 | Allen et al. .................. 714/763 |

\* cited by examiner

Primary Examiner—Khanh Dang
(74) Attorney, Agent, or Firm—Harrity & Snyder, LLP

(57) ABSTRACT

A network device includes redundant buses, redundant master controllers, and slave controllers. Each of the master controllers connects to a corresponding one of the buses. One of the master controllers acts as an active master and the other master controllers act as standby masters. The active master commences a bus cycle that includes an address interval and a data interval, provides a destination address on the corresponding bus during the address interval, and transmits or receives a command or data during the data interval. The slave controllers connect to the bus, detect commencement of the bus cycle, sample the destination address from the bus a predetermined amount of time after commencement of the address interval, and transmit or receive a command or data during the data interval.

29 Claims, 7 Drawing Sheets

RELIABLE AND REDUNDANT CONTROL SIGNALS IN A MULTI-MASTER SYSTEM

BACKGROUND OF THE INVENTION

A. Field of the Invention

The present invention relates generally to routing systems and, more particularly, to reliable and redundant control signals in a multi-master system.

B. Description of Related Art

Conventional control systems are replete with problems. For example, some conventional systems use dedicated wiring to transmit control signals. This adds cost and complexity as the number of wires may become quite large. Because many of the control signals are slowly changing, static, or DC in nature, it is often difficult to keep them immune from noise and failure.

Therefore, there exists a need for reliable and redundant use of these control signals in a manner that provides fault detection, fault isolation, and upgradability.

SUMMARY OF THE INVENTION

Systems and methods, consistent with the present invention, address this and other needs by providing control signals on redundant buses of a multi-master control system. A master device controls the bus operations and creates an address interval and a data interval. During the data interval, the master device can read and write data and commands with the slave devices and check the integrity of the system. The slave devices sample addresses and data on the bus a predetermined amount of time after the start of the corresponding address or data interval to permit the signals on the bus to stabilize.

In accordance with the purpose of the invention as embodied and broadly described herein, a network device includes redundant buses, redundant master controllers, and slave controllers. Each of the master controllers connects to a corresponding one of the buses. One of the master controllers acts as an active master and the other master controllers act as standby masters. The active master commences a bus cycle that includes an address interval and a data interval, provides a destination address on the corresponding bus during the address interval, and transmits or receives a command or data during the data interval. The slave controllers connect to the bus, detect commencement of the bus cycle, sample the destination address from the bus a predetermined amount of time after commencement of the address interval, and transmit or receive a command or data during the data interval.

In another implementation consistent with the present invention, a method for using a redundant bus by a master device and multiple slave devices in a multi-master system, includes commencing a bus cycle by the master device, the bus cycle including an address interval followed by a data interval; providing, by the master device, a destination address on the bus during the address interval; sampling, by the slave devices, the destination address on the bus a predetermined amount of time after a start of the address interval; commencing read and write cycles by the master device; during the data interval of the read cycle, transmitting data to the master device by one of the slave devices that corresponds to the destination address; and during the data interval of the write cycle, transmitting data from the master device to one of the slave devices that corresponds to the destination address.

In yet another implementation consistent with the present invention, a bus includes multiplexed address and data signal lines, a cycle valid signal line, a data/address interval signal line, a read/write signal line, and parity signal lines. The multiplexed address and data signal lines transport address, data, and commands. The cycle valid signal line indicates commencement of a bus cycle that includes an address interval and a data interval. The data/address interval signal line differentiates between the address interval and the data interval. The read/write signal line indicates commencement of read and write cycles. The parity signal lines provide parity information relating to the multiplexed address and data signal lines, the cycle valid signal line, the data/address interval signal line, and the read/write signal line.

In a further implementation consistent with the present invention, a multi-master system includes multiple redundant buses, multiple slave devices connected to the buses, and at least first and second master devices connected to corresponding ones of the buses. The first master device is configured to transmit a read-back signal to a destination device, receive a reply to the read-back signal, and determine the integrity of the destination device based on the received reply.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods, consistent with the present invention, provide control signals over redundant buses of a multi-master system. The systems and methods combine commands and register accesses in a single bus and provide parity over these signals. By using a bus, the number of signals may be kept manageable. By combining commands and register accesses in one bus, a balance may be achieved between high reliability and higher input/output count. By using parity-protected bus cycles, the windows of vulnerability may be reduced and protected and fault detection may be provided.

Exemplary Network Device Configuration

Figure 1:
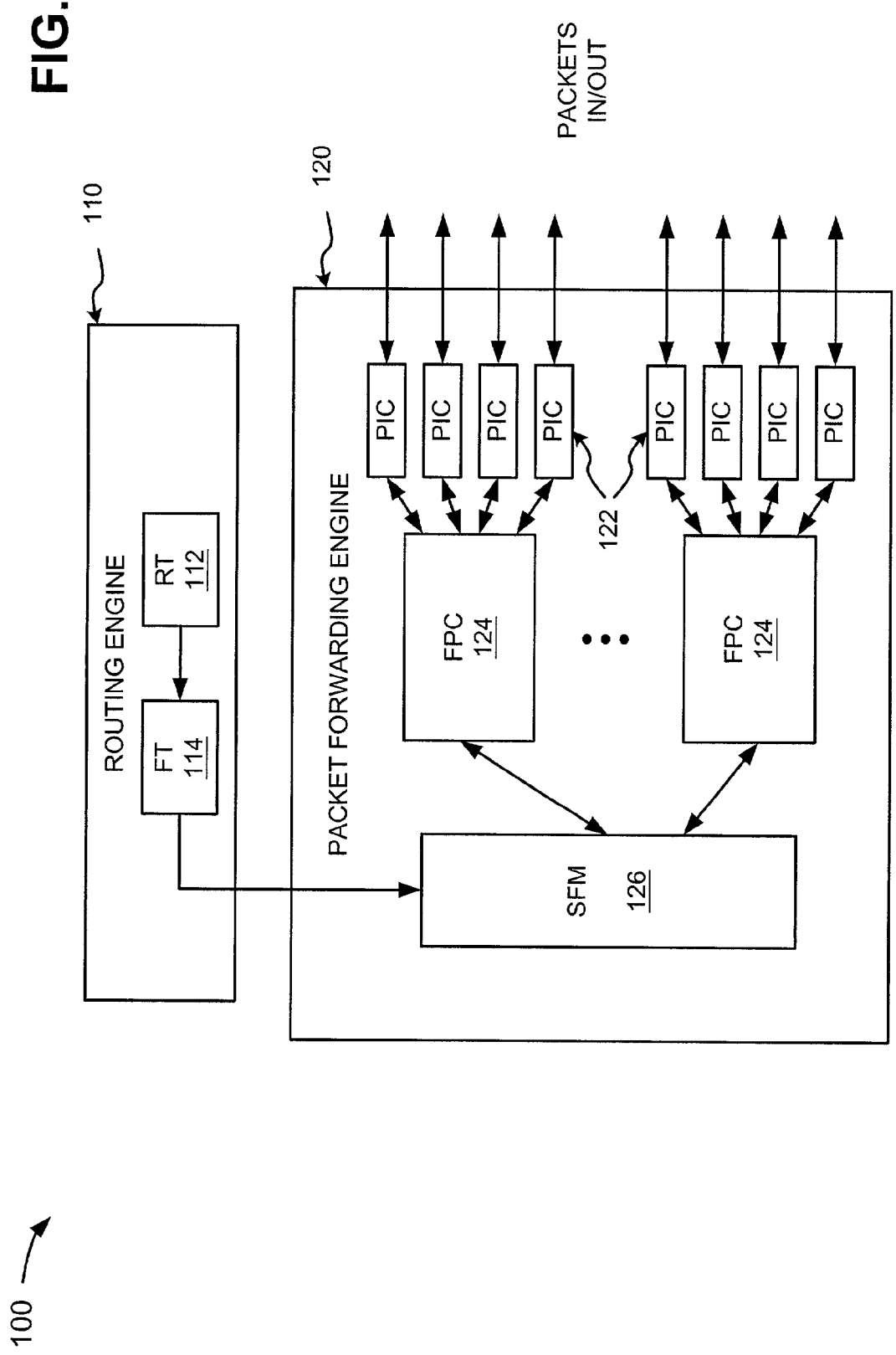
FIG. 1 is a diagram of an exemplary network device in which systems and methods consistent with the present invention may be implemented.

FIG. 1 is a diagram of an exemplary network device in which systems and methods consistent with the present invention may be implemented. In this particular implementation, the network device takes the form of a router 100.

The router 100 may include a routing engine 110 and a packet forwarding engine 120. The routing engine 110 may perform routing updates and system management operations for the router 100. The routing engine 110 may include one or more routing tables 112 and a forwarding table 114. The routing table(s) 112 may consolidate routing information learned from routing protocols in the network. From the routing table(s) 112, the routing engine 110 determines the active routes to network destinations and records these routes in the forwarding table 114.

The packet forwarding engine 120 may make packet forwarding decisions for the router 100. The packet forwarding engine 120 may include programmable interface cards (PICs) 122, flexible PIC concentrators (FPCs) 124, and one or more switching and forwarding modules (SFMs) 126. The PICs 122 receive and transmit packets for the router 100. The PICs 122 may include media-specific logic that performs, for example, framing and checksum verification. Different types of PICs 122 may operate according to different transmission rates, such as OC-192 and OC-48 transmission rates, and protocols, such as the Synchronous Optical Networking (SONET), Asynchronous Transfer Mode (ATM), and Ethernet protocols.

The FPCs 124 may include input/output control logic that directs and manages the packets received and transmitted by the PICs 122. The FPCs 124 may, for example, count packets and bytes, apply class-of-service rules to packets, prioritize packets, and perform basic packet integrity checks. The SFM(s) 126 may include logic that determines how to route the packets. The SFM(s) 126 may operate upon packet header information received from the FPCs 124 to identify the PIC 122 to output the packet. The SFM(s) 126 may use information from the forwarding table 114 to make this determination.

The routing engine 110 and packet forwarding engine 120 may be configured as a number of circuit boards in the router 100. For example, the packet forwarding engine 120 may include separate circuit boards for the SFMs 126 and the FPCs 124 interconnected by a midplane.

Figure 2:
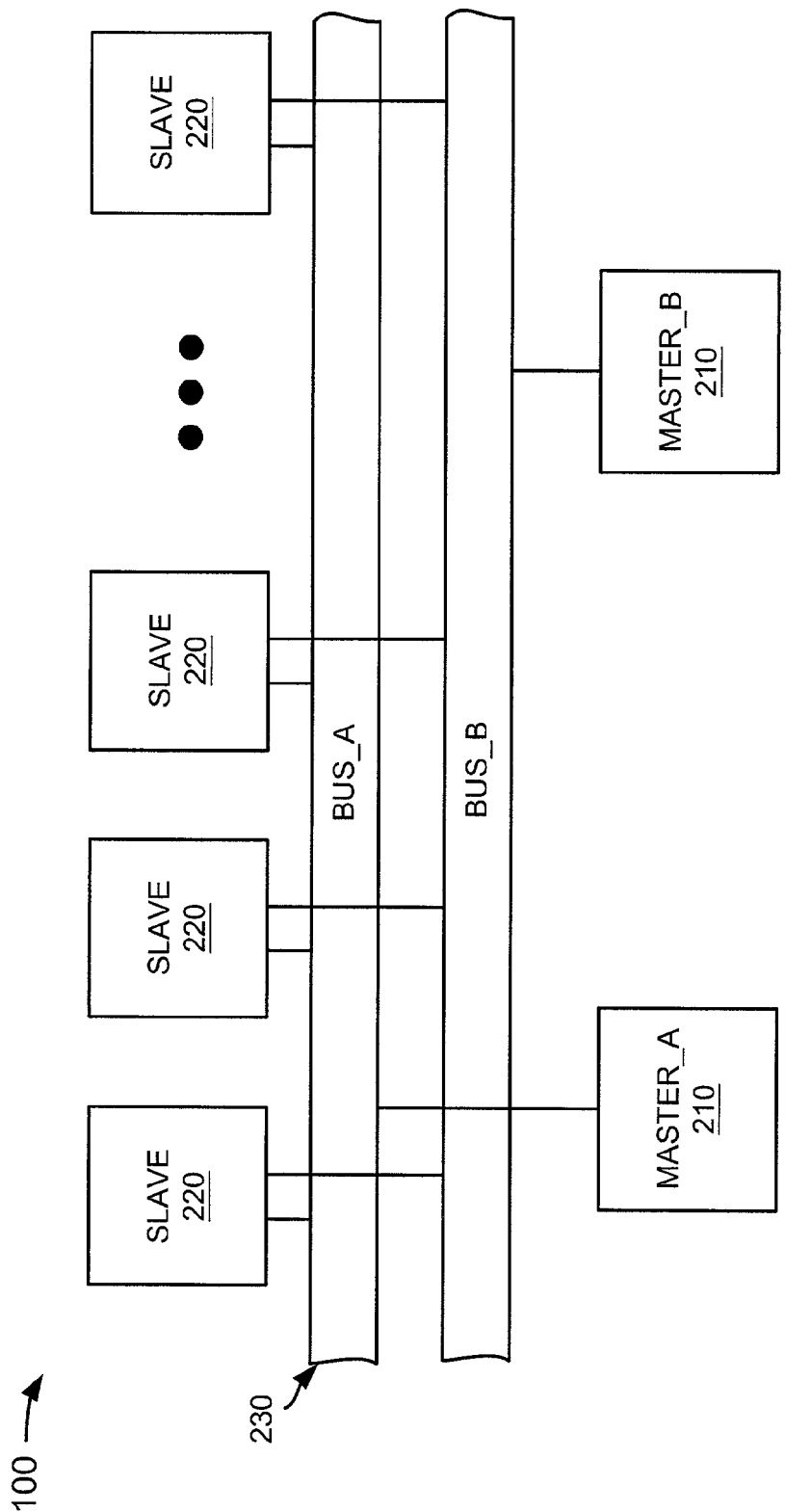
FIG. 2 is a simplified block diagram of the network device of FIG. 1.

FIG. 2 is a simplified block diagram of the router 100 according to an implementation consistent with the present invention. In this implementation, the router 100 includes master devices 210 and slave devices 220 connected to redundant buses 230. The master devices 210 may include, for example, hardware and/or software controllers in the routing engine 110 or the SFMs 126 of FIG. 1. The slave devices 220 may include, for example, hardware and/or software controllers in the routing engine 110, FPCs 124, SFMs 126, and possibly PICs 122. Some of the components shown in FIG. 1, such as the routing engine 110 or the SFMs 126, may include both a master device 210 and a slave device 220.

Each of the master devices 210 controls the operation of a corresponding one of the buses 230. For example, in FIG. 2, master_A may control the operation of bus_A and master_B may control the operation of bus_B. At any time, one of the master devices 210 may act as the active master and the other master device 210 may assume the role of the standby master. The slave devices 220 connect to both buses 230, but communicate and respond to signals on only the bus 230 corresponding to the active master.

Figure 3:
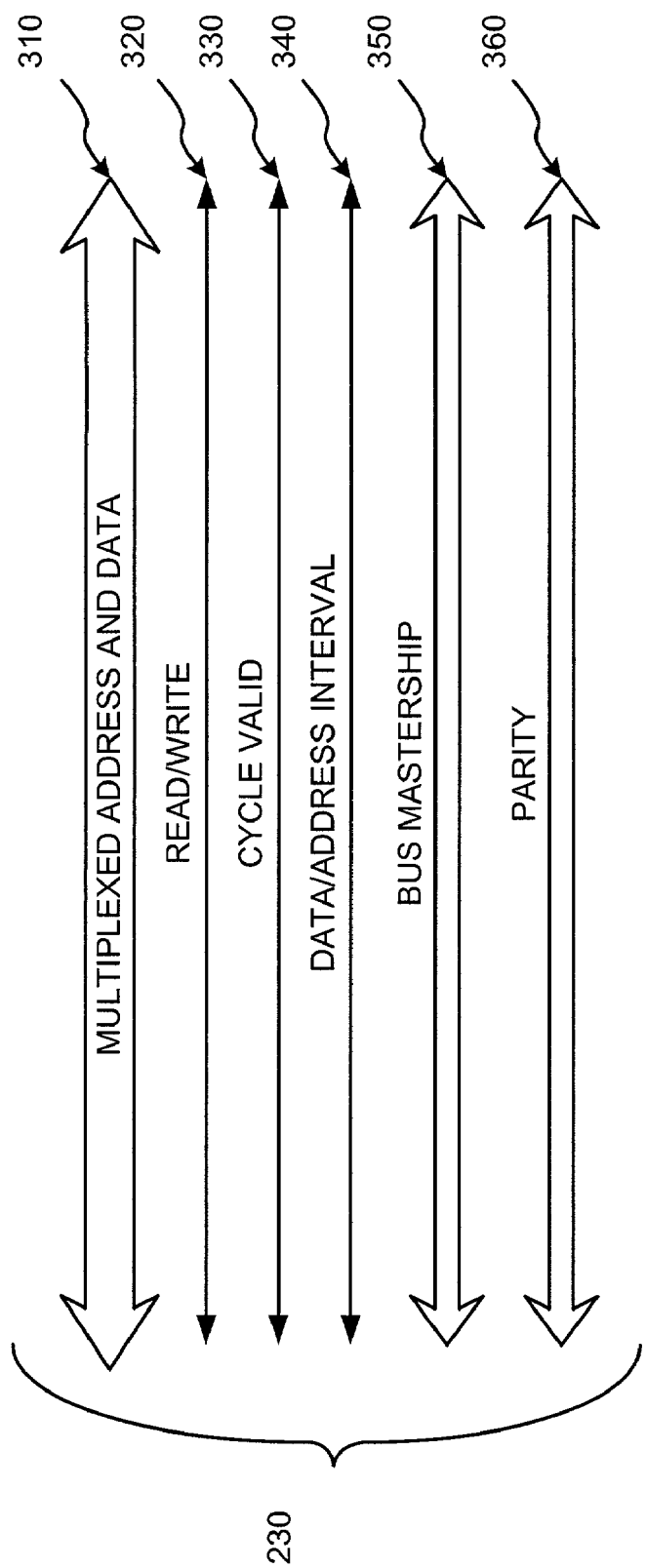
FIG. 3 is an exemplary diagram of the bus of FIG. 2.

FIG. 3 is an exemplary diagram of one of the redundant buses 230 according to an implementation consistent with the present invention. The other redundant bus may be similarly configured. According to this implementation, the bus 230 includes fifteen signal lines for transmitting data and control signals. Cycles on the bus 230 may be two intervals in length with an address interval followed by a data interval. The master device 210 controls the bus cycle to send a command or read or write a register on one or more of the slave devices 220.

According to FIG. 3, the bus 230 includes multiplexed address and data lines 310, read/write line 320, cycle valid line 330, data/address interval line 340, bus mastership lines 350, and parity lines 360. The multiplexed address and data lines 310 may be used to transmit eight bidirectional multiplexed address and data signals. The read/write line 320 may be used to transmit signals that differentiate read and write operations. Signals on the cycle valid line 330 may be used to indicate whether the current communication interval is valid. The data/address interval line 340 may be used to transmit signals that differentiate the address interval from the data interval. Signals on the bus mastership lines 350 may be used by the slave devices 220 to determine which of the master devices 210 is the active master and, thus, which of the buses 230 is the active bus. The parity lines 360 may include two lines that transmit parity information: one for the multiplexed address and data lines 310 and the other one for the remaining signal lines 320–350.

Figure 4:
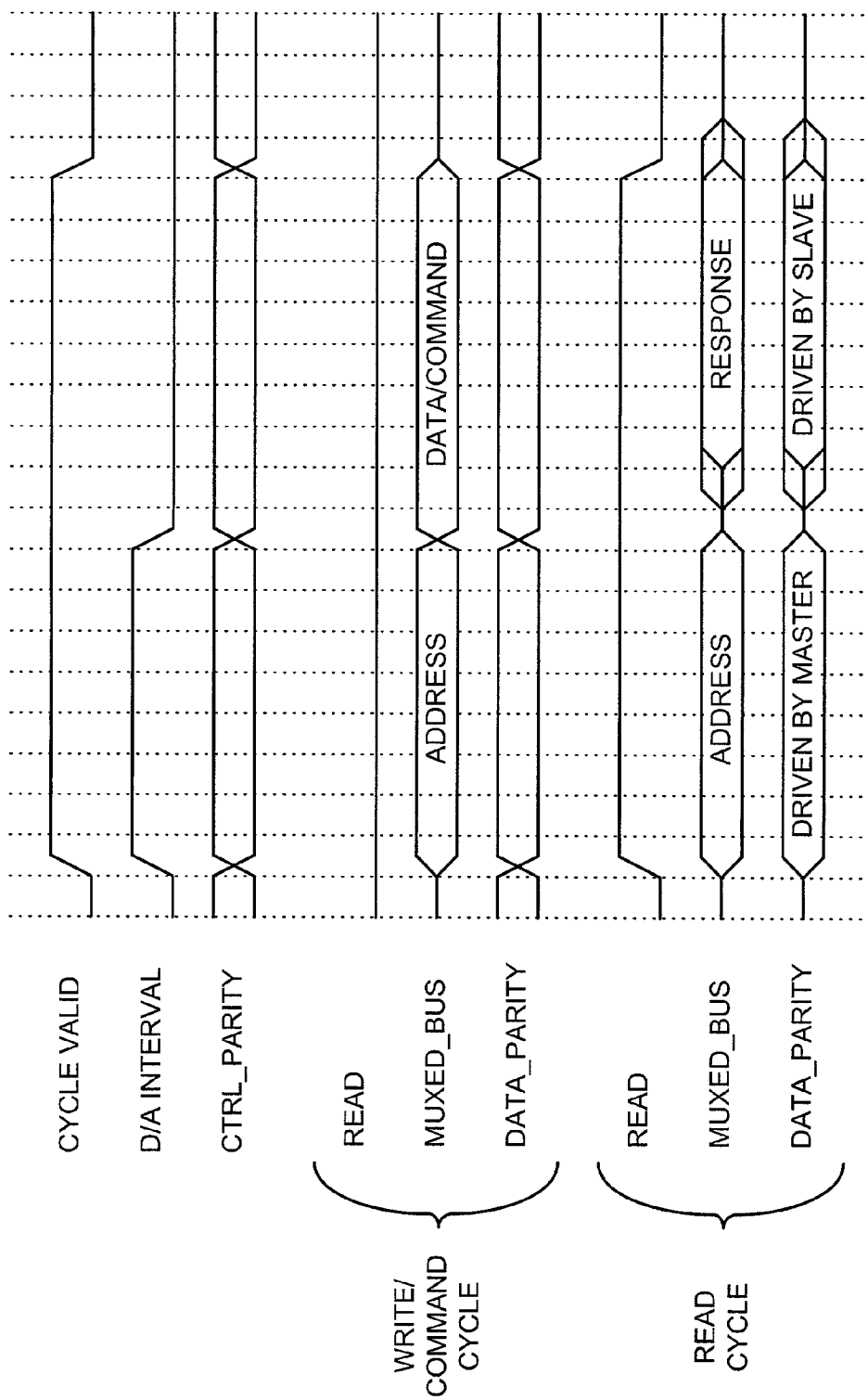
FIG. 4 is an exemplary timing diagram of potential bus cycles on the bus of FIG. 3.

FIG. 4 is an exemplary timing diagram of potential bus cycles on the bus 230. The master device 210 initiates and controls the bus operations. The master device 210 generates bus cycles that include an address interval followed by a data interval. The master device 210 indicates the start of a cycle using the cycle valid signal 330. Within the cycle, the master device 210 differentiates between address transmissions and data transmissions using the signal on the data/address (D/A) interval line 340 and differentiates between reads and writes using the signal on the read/write line 320.

Exemplary Processing

Figure 5:
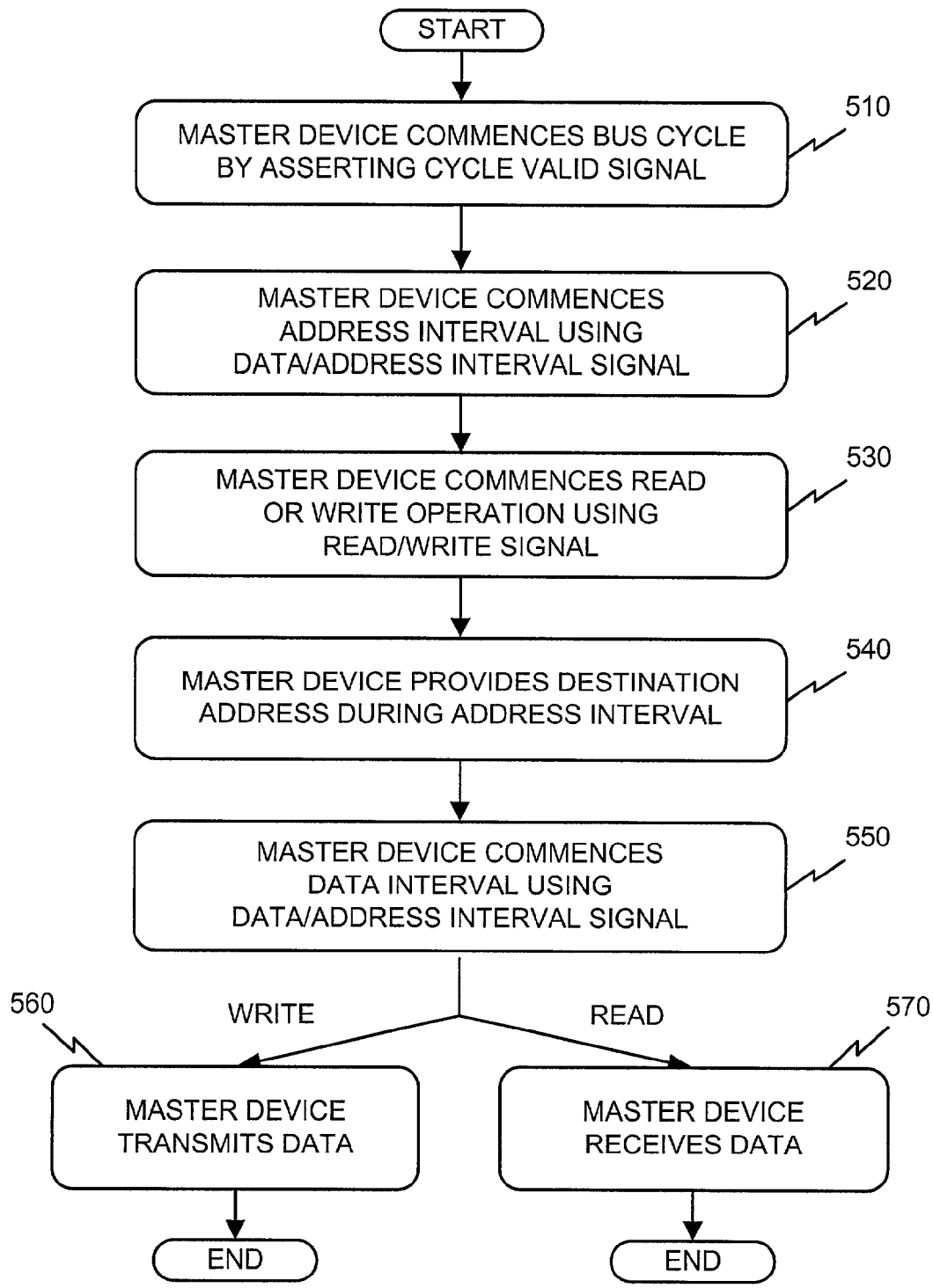
FIG. 5 is a flowchart of exemplary processing by a master device for operating a bus according to an implementation consistent with the present invention.

FIG. 5 is a flowchart of exemplary processing by the master device 210 for operating the bus 230 according to an implementation consistent with the present invention. The master device 210 controls the bus operations. The master device 210 drives the bus 230 using, for example, a 25 MHz clock and holds each cycle of the bus 230 for 32 clock cycles (i.e., 1.28 $\mu$s). Operation of the bus 230 may begin with the master device 210 asserting a signal on the cycle valid line 330 and commencing an address interval using the signal on the data/address interval line 340 [acts 510 and 520]. The master device 210 may also commence a read or write cycle using the signal on the read/write line 320 [act 530]. The master device 210 may then provide a destination address on the multiplexed address and data lines 310 [act 540]. The address may specify a slave device 220, a category of slave devices 220, or all slave devices 220 (broadcast modes) and possibly an address of a register within the slave device 220 or an indication of a command cycle.

The master device 210 may then commence a data interval using the signal on the data/address interval line 340 [act 550]. During the data interval of a write cycle, the master device 210 transmits data [act 560]. This data may include either a command or actual data, depending upon the address provided in the address interval. Commands may include control signals for setting or clearing an individual bit or select line or for changing the operating mode, such as for setting up a read-back operation. As described in more detail below, the master device 210 may use the read-back operation to check the integrity of the system. If the master device 210 sends actual data, the data may be written to the register specified during the address interval.

During the data interval of a read cycle, the master device 210 ceases to drive the bus 230, thereby allowing the slave device 220 that was addressed in the address interval to drive data back to the master device 210 [act 570]. The data may include either a command or actual data, depending upon the address provided in the address interval. For a command read, the master device 210 may receive data from a location specified by a previous read-back command. For a data read, the master device 210 may receive data from the register identified during the address interval. The "broadcast" addressing modes may be disallowed on read cycles.

Figure 6:
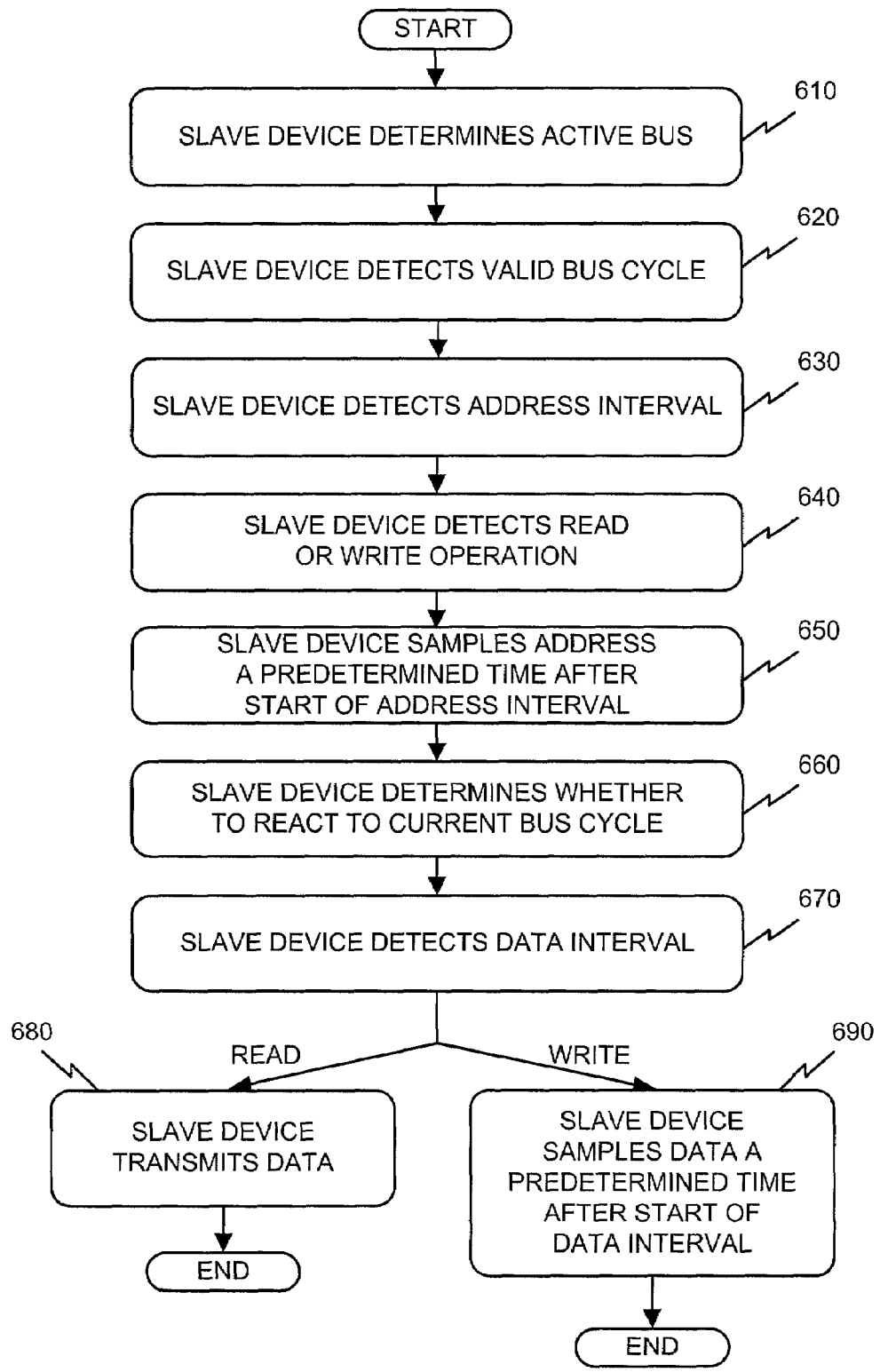
FIG. 6 is a flowchart of exemplary processing by a slave device according to an implementation consistent with the present invention.

FIG. 6 is a flowchart of exemplary processing by a slave device 220 according to an implementation consistent with the present invention. The slave device 220 may monitor both the active and standby buses 230 to ensure that the parity lines 360 are consistent with the transmitted information. The slave device 220 may respond only to reads and/or only to writes on the active bus 230. To this extent, the slave device 220 may identify the active bus 230 using, for example, the signals on the bus mastership lines 350 [act 610]. The slave device 220 may then detect a valid bus cycle using, for example, the signal on the cycle valid line 330 [act 620].

The slave device 220 may detect commencement of an address interval based on the signal on the data/address interval line 340 and commencement of a read or write operation using the signal on the read/write line 320 [acts 630 and 640]. The slave device 220 may use a 10 MHz clock to sample addresses and data on the bus 230. The slave device 220 may time its sampling points rather than using an edge from the master device 210. The slave device 220 may time its sampling points from signal edges on the cycle valid line 330 and data/address interval line 340 to permit the bus 230 to stabilize at the sampling point, thereby improving immunity to glitches. In an implementation consistent with the present invention, the slave device 220 samples the address on the bus 230 five clock cycles (i.e., 0.8 $\mu$s) after detecting a stable start of the address interval [act 650].

The slave device 220 may then determine whether to react to the current bus cycle based, for example, on the address on the bus 230 during the address interval [act 660]. If the slave device 220 participates in the current bus cycle, the slave device 220 may detect commencement of a data interval based on the signal on the data/address interval line 340 [act 670]. During the data interval of a read cycle, the slave device 220 may drive data on the bus 230 possibly for the entire time between commencement of the data interval and completion of the bus cycle [act 680]. The data may include command or register data based on the address received during the address interval. During the data interval of a write cycle, the slave device 220 may sample data on the bus 230 a predetermined amount of time, such as five clock cycles (i.e., 0.8 $\mu$s), after detecting a stable start of the data interval [act 690].

Figure 7:
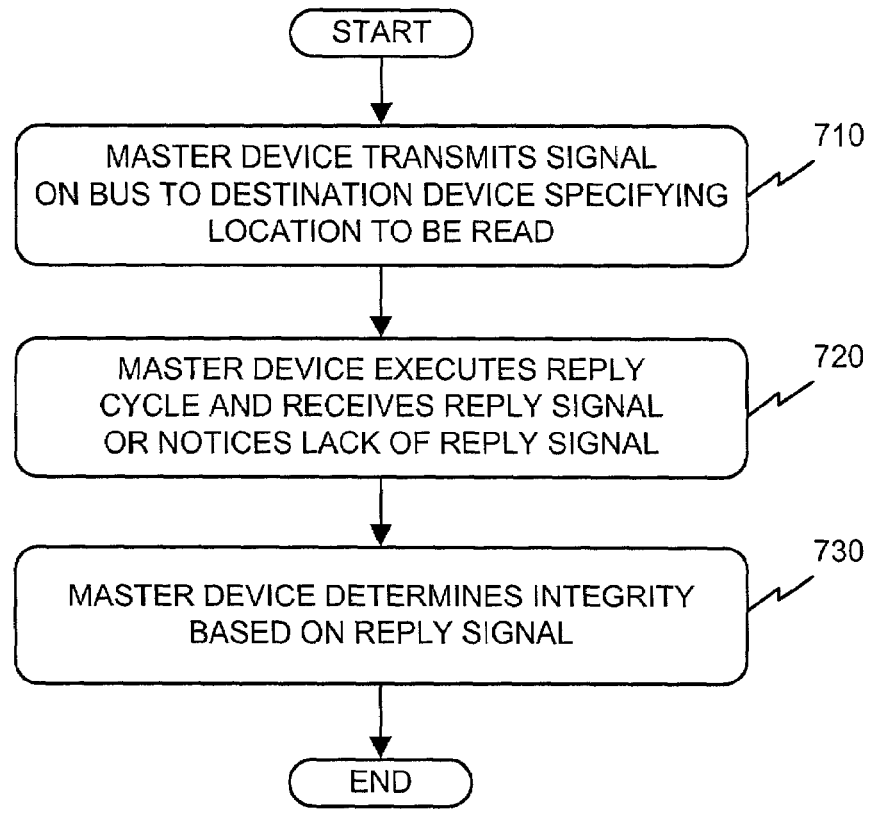
FIG. 7 is an exemplary flowchart for checking integrity according to an implementation consistent with the present invention.

FIG. 7 is an exemplary flowchart for checking integrity according to an implementation consistent with the present invention. To check the integrity of the system 100, the master device 210 may transmit a signal on the bus 230 to a destination device that identifies a location to be read [act 710]. The destination device may include the other master device 210, a slave device 220, or the master device 210 transmitting the signal. The signal may take the form of a read-back signal (i.e., a signal that sets up for a reply from the device receiving it).

The destination device may receive the signal and, when it is operational, it may generate a reply. The master device 210 may execute a reply cycle to receive the reply or notice the lack of reply [act 720]. For example, the master device 210 may wait for a predetermined amount of time to receive a reply and, after that time, determine that no reply is forthcoming. Based on the reply or lack of reply, the master device 210 may determine the integrity of the destination device [act 730]. When the destination device takes the form of the other master device 210 or a slave device 220, the master device 210 may determine the integrity of the other master device 210, the slave device 220, and/or the bus 230. When the destination device takes the form of the master device 210 sending the original signal, the master device 210 may determine the integrity of the bus 230 and its own components.

CONCLUSION

Systems and methods, consistent with the present invention, combine commands and register accesses on redundant buses in a multi-master system. A master device controls the bus operations and creates an address interval and a data interval. During the data interval, the master device can read data and commands from and write data and commands to the slave devices and check the integrity of the system. The slave devices sample address and data on the bus a predetermined amount of time after the start of the corresponding address or data interval to permit the signals on the bus to stabilize.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5–7, the order of the acts may differ in other implementations consistent with the present invention.

Also, an exemplary system has been described with regard to FIG. 2. In other implementations consistent with the present invention, the system may differ. For example, the system may include more or less master devices and/or buses.

Further, an exemplary bus has been described with regard to FIG. 3. In other implementations consistent with the present invention, the bus may contain more, less, or different signals.

The scope of the invention is defined by the claims and their equivalents.

What is claimed is:

1. A control system, comprising:
   a bus;
   a master device connected to the bus and configured to commence a bus cycle that includes an address interval and a data interval, provide a destination address on the bus during the address interval, and transmit or receive a command or data during the data interval; and
   a plurality of slave devices connected to the bus and configured to:

detect commencement of the bus cycle,
begin to sample the destination address from the bus, the sampling beginning a plurality of clock cycles after commencement of the address interval, and
transmit or receive a command or data during the data interval.

2. The control system of claim 1, wherein the bus includes a plurality of redundant buses and the master device includes a plurality of redundant master devices, each of the redundant master devices controlling one of the redundant buses.

3. The control system of claim 1, wherein the bus includes:
multiplexed address and data signal lines configured to transport address, data, and commands,
a cycle valid signal line configured to indicate a valid bus cycle, and
a data/address interval signal line configured to differentiate the data interval from the address interval.

4. The control system of claim 3, wherein the bus further includes:
parity signal lines that aid in detecting failures in the multiplexed address and data signal lines, the cycle valid signal line, and the data/address interval signal line.

5. The control system of claim 1, wherein the destination address corresponds to an address of one of the slave devices.

6. The control system of claim 1, wherein the master device is further configured to commence a read or write cycle on the bus.

7. The control system of claim 6, wherein during the data interval of the read cycle, one of the slave devices is configured to drive a command or data on the bus until completion of the bus cycle.

8. The control system of claim 7, wherein the one slave device corresponds to the destination address sampled during the address interval.

9. The control system of claim 6, wherein during the data interval of the write cycle, one of the slave devices is configured to sample a command or data on the bus a predetermined amount of time after commencement of the data interval.

10. The control system of claim 9, wherein the predetermined amount of time is approximately 5 clock cycles.

11. The control system of claim 6, wherein during the data interval of the read cycle, the master device is configured to cease driving the bus to permit one of the slave devices to drive data back to the master device.

12. The control system of claim 6, wherein during the data interval of the write cycle, the master device is configured to transmit a command or data on the bus.

13. The control system of claim 1, wherein the master device is further configured to transmit a read-back signal to a destination device, receive a reply to the read-back signal, and determine the integrity of the destination device based on the received reply.

14. The control system of claim 13, wherein the destination device includes at least one of another master device and one of the slave devices.

15. The control system of claim 13, wherein the destination device includes the master device.

16. The control system of claim 1, wherein the control system is a network device, the master device is a controller of a routing engine, and the slave devices are controllers of a packet forwarding engine.

17. A method for using a redundant bus by a master device and a plurality of slave devices in a multi-master system, comprising:
commencing a bus cycle by the master device, the bus cycle including an address interval followed by a data interval;
providing, by the master device, a destination address on the bus during the address interval;
sampling, by the slave devices, the destination address on the bus, the sampling beginning a plurality of clock cycles after a start of the address interval;
commencing read and write cycles by the master device;
during the data interval of the read cycle, transmitting data to the master device by one of the slave devices that corresponds to the destination address; and
during the data interval of the write cycle, transmitting data from the master device to one of the slave devices that corresponds to the destination address.

18. The method of claim 17, further comprising:
during the data interval of the write cycle, sampling data on the bus, by one of the slave devices that corresponds to the destination address, a predetermined amount of time after a start of the data interval.

19. The method of claim 18, wherein the predetermined amount of time is 5 clock cycles.

20. The method of claim 17, wherein the plurality of clock cycles include 5 clock cycles.

21. A bus, comprising:
multiplexed address and data signal lines operatively connected to the bus and configured to transport address, data, and commands;
a cycle valid signal line operatively connected to the bus and configured to indicate commencement of a bus cycle that includes an address interval and a data interval;
a data/address interval signal line operatively connected to the bus and configured to differentiate between the address interval and the data interval;
a read/write signal line operatively connected to the bus and configured to indicate commencement of read and write cycles; and
parity signal lines operatively connected to the bus and configured to provide parity information relating to the multiplexed address and data signal lines, the cycle valid signal line, the data/address interval signal line, and the read/write signal line.

22. The bus of claim 21, wherein the parity signal lines transmit two bits, one of the bits provides parity over the multiplexed address and data signal lines and the other one of the bits provides parity over the cycle valid signal line, the data/address interval signal line, and the read/write signal line.

23. A device, comprising:
a plurality of redundant buses;
a plurality of redundant master controllers connected to corresponding ones of the buses, one of the master controllers being an active master and other ones of the master controllers being standby masters, the active master being configured to commence a bus cycle that includes an address interval and a data interval, provide a destination address on the corresponding bus during the address interval, and transmit or receive a command or data during the data interval; and
a plurality of slave controllers connected to the bus and configured to:

detect commencement of the bus cycle,
sample the destination address from the bus the sampling beginning one or more clock cycles after commencement of the address interval, and
transmit or receive a command or data during the data interval.

24. The device of claim 23, wherein the network device is a router.

25. The device of claim 24, wherein the redundant master controllers are redundant routing engines and the slave controllers are switching and forwarding modules.

26. A control system that includes a bus, comprising:
means, operatively connected to the bus, for commencing a bus cycle on the bus, the bus cycle including an address interval followed by a data interval;
means, operatively connected to the bus, for providing a destination address on the bus during the address interval;
means, operatively connected to the bus, for sampling the destination address on the bus, the sampling beginning a plurality of first clock cycles after a start of the address interval;
means, operatively connected to the bus, for providing data on the bus during the data interval; and
means, operatively connected to the bus, for sampling the data on the bus, the sampling beginning a plurality of second clock cycles after a start of the data interval.

27. A multi-master system, comprising:
a plurality of redundant buses;
a plurality of slave devices connected to the buses; and
at least first and second master devices connected to corresponding ones of the buses, the first master device being configured to transmit a read-back signal to a destination device, receive a reply to the read-back signal, and determine the integrity of the destination device based on the received reply.

28. The multi-master system of claim 27, wherein the destination device includes at least one of the second master device and one of the slave devices.

29. The multi-master system of claim 27, wherein the destination device includes the first master device.

* * * * *

UNITED STATES PATENT AND TRADEMARK OFFICE
CERTIFICATE OF CORRECTION

PATENT NO. : 6,970,961 B1
APPLICATION NO. : 09/751841
DATED : November 29, 2005
INVENTOR(S) : Ross Heitkamp et al.

It is certified that error appears in the above-identified patent and that said Letters Patent is hereby corrected as shown below:

On the Title Page, Item (75)
Please add --Chang-Hong Wu, Cupertino, CA (US)-- to the list of inventors on the Letters Patent cover page.

Signed and Sealed this

Twenty-fourth Day of June, 2008

JON W. DUDAS
*Director of the United States Patent and Trademark Office*